(12) United States Patent
Xiao et al.

(10) Patent No.: US 11,063,248 B2
(45) Date of Patent: Jul. 13, 2021

(54) PROTECTIVE COATING FOR LITHIUM-CONTAINING ELECTRODE AND METHODS OF MAKING THE SAME

(71) Applicant: GM GLOBAL TECHNOLOGY OPERATIONS LLC, Detroit, MI (US)

(72) Inventors: Xingcheng Xiao, Troy, MI (US); Mei Cai, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 211 days.

(21) Appl. No.: 15/988,487

(22) Filed: May 24, 2018

(65) Prior Publication Data

US 2019/0363345 A1 Nov. 28, 2019

(51) Int. Cl.
| | |
|---|---|
| *H01M 4/1395* | (2010.01) |
| *H01M 10/052* | (2010.01) |
| *H01M 4/134* | (2010.01) |
| *H01M 4/38* | (2006.01) |
| *H01M 4/62* | (2006.01) |
| *H01M 4/02* | (2006.01) |
| *B82Y 30/00* | (2011.01) |
| *B82Y 40/00* | (2011.01) |

(52) U.S. Cl.
CPC ......... *H01M 4/1395* (2013.01); *H01M 4/134* (2013.01); *H01M 4/382* (2013.01); *H01M 4/628* (2013.01); *H01M 10/052* (2013.01); *B82Y 30/00* (2013.01); *B82Y 40/00* (2013.01); *H01M 2004/027* (2013.01); *H01M 2220/20* (2013.01); *Y10S 977/734* (2013.01); *Y10S 977/842* (2013.01); *Y10S 977/948* (2013.01)

(58) Field of Classification Search
None
See application file for complete search history.

(56) References Cited

U.S. PATENT DOCUMENTS

| | | | |
|---|---|---|---|
| 4,925,751 A * | 5/1990 | Shackle | H01M 4/02 429/314 |
| 8,974,946 B2 | 3/2015 | Cai et al. | |
| 9,123,939 B2 | 9/2015 | Xiao et al. | |
| 9,160,036 B2 | 10/2015 | Yang et al. | |
| 9,252,411 B2 | 2/2016 | Abd Elhamid et al. | |

(Continued)

FOREIGN PATENT DOCUMENTS

| | | |
|---|---|---|
| CN | 110534704 A | 12/2019 |
| DE | 102019111417 A | 11/2019 |

(Continued)

OTHER PUBLICATIONS

Fang Dai et al.; U.S. Appl. No. 15/473,052, filed Mar. 29, 2017 entitled "Microporous and Hierarchical Porous Carbon"; 48 pages.

(Continued)

*Primary Examiner* — Lucas J. O'Donnell
(74) *Attorney, Agent, or Firm* — Harness, Dickey & Pierce, P.L.C.

(57) ABSTRACT

Methods of removing a passivation layer on a lithium-containing electrode and preparing a protective coating on the lithium-containing electrode by applying a graphene source are provided herein. A lithium-containing electrode with the protective coating including graphene and lithium-containing electrochemical cells including the same are also provided herein.

9 Claims, 8 Drawing Sheets

(56) References Cited

U.S. PATENT DOCUMENTS

| | | | |
|---|---|---|---|
| 9,302,914 | B2 | 4/2016 | Liu et al. |
| 9,362,552 | B2 | 6/2016 | Sohn et al. |
| 9,437,871 | B2 | 9/2016 | Zhou et al. |
| 9,537,144 | B2 | 1/2017 | Huang et al. |
| 9,647,254 | B2 | 5/2017 | Dadheech et al. |
| 9,742,028 | B2 | 8/2017 | Zhou et al. |
| 9,896,763 | B2 | 2/2018 | Dadheech et al. |
| 9,905,847 | B2 | 2/2018 | Dadheech et al. |
| 10,381,170 | B2 | 8/2019 | Dai et al. |
| 10,431,849 | B2 | 10/2019 | Yersak et al. |
| 2015/0056387 | A1 | 2/2015 | Dadheech et al. |
| 2015/0056493 | A1 | 2/2015 | Dadheech et al. |
| 2015/0056507 | A1 | 2/2015 | Dadheech et al. |
| 2015/0236324 | A1 | 8/2015 | Xiao et al. |
| 2015/0349307 | A1 | 12/2015 | Dadheech et al. |
| 2016/0013462 | A1* | 1/2016 | Cui ............... H01M 4/1395 429/126 |
| 2016/0020491 | A1 | 1/2016 | Dai et al. |
| 2016/0111721 | A1 | 4/2016 | Xiao et al. |
| 2016/0141598 | A1 | 5/2016 | Dai et al. |
| 2016/0172665 | A1 | 6/2016 | Zhou et al. |
| 2016/0172681 | A1 | 6/2016 | Yang et al. |
| 2016/0172706 | A1 | 6/2016 | Xiao et al. |
| 2016/0172710 | A1 | 6/2016 | Liu et al. |
| 2016/0218342 | A1 | 7/2016 | Xiao et al. |
| 2016/0254567 | A1 | 9/2016 | Cai et al. |
| 2016/0344010 | A1* | 11/2016 | Zhamu ............... H01M 2/1686 |
| 2017/0141382 | A1 | 5/2017 | Dadheech et al. |
| 2017/0162859 | A1 | 6/2017 | Yang et al. |
| 2017/0214079 | A1 | 7/2017 | Dai et al. |
| 2017/0222210 | A1 | 8/2017 | Xiao |
| 2017/0271678 | A1 | 9/2017 | Yang et al. |
| 2017/0288230 | A1 | 10/2017 | Yang et al. |
| 2017/0338490 | A1 | 11/2017 | Xiao et al. |
| 2018/0048022 | A1 | 2/2018 | Yang et al. |
| 2018/0123114 | A1* | 5/2018 | Cho ............... H01M 4/0402 |
| 2018/0212270 | A1* | 7/2018 | Krause ............... H01M 4/1393 |
| 2018/0309166 | A1 | 10/2018 | Yersak et al. |
| 2018/0375148 | A1 | 12/2018 | Yersak et al. |

FOREIGN PATENT DOCUMENTS

| | | |
|---|---|---|
| WO | WO-2014182281 A1 | 11/2014 |
| WO | WO-2017045573 A1 | 3/2017 |

OTHER PUBLICATIONS

Cheng et al.; "Dual-Phase Lithium Metal Anode Containing a Polysulfide-Induced Solid Electrolyte Interphase and Nanostructured Graphene Framework for Lithium-Sulfur Batteries"; ACS Nano, 2015, 9 (6), pp. 6373-6382. DOI: 10.1021/acsnano.5b01990.

Eberhardt et al., "Charge-Transfer and Non-Rigid-Band Effects in the Graphite Compound $LiC_6$"; Physical Review Letters, vol. 44, No. 3, 200-204 (Jan. 1980).

Khantha et al., "Interaction of lithium with graphene: An ab initio study"; Physical Review B, 70, 125422, 8 pages (2004).

Liu et al., "Crumpled Graphene Balls Stabilized Dendrite-free Lithium Metal Anodes"; Joule 2, 184-193, Jan. 17, 2018; © 2017 Elsevier Inc., https://doi.org/10.1016/j.joule.2017.11.004.

Liu et al., "Interlayer binding energy of graphite: a mesoscopic determination from deformation"; Physical Review B, 85, 205418, 5 pages (2012).

Qi et al, "Threefold Increase in the Young's Modulus of Graphite Negative Electrode during Lithium Intercalation"; Journal of the Electrochemical Society, 157 (5) A558-A566 (2010).

Valencia et al, "Lithium Adsorption on Graphite from Density Functional Theory Calculations"; J. Phys. Chem. B 2006, 110, 14832-14841.

Zhao et al.; "Air-stable and freestanding lithium alloy/graphene foil as an alternative to lithium metal anodes"; Nature Nanotechnology vol. 12, pp. 993-999 (2017); doi:10.1038/nnano.2017.129.

* cited by examiner

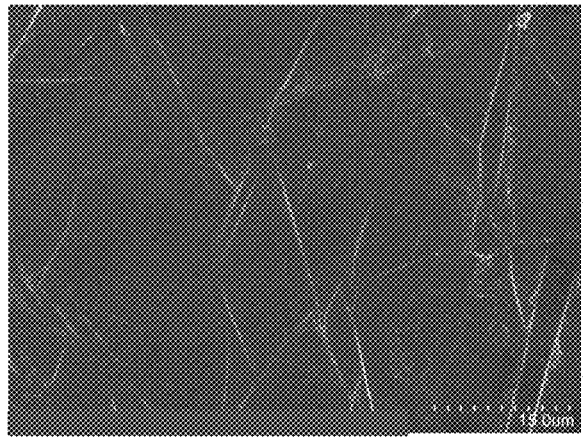
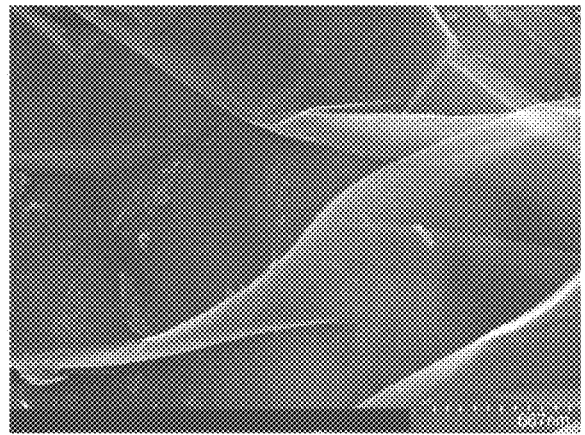
FIG. 7A  FIG. 7B
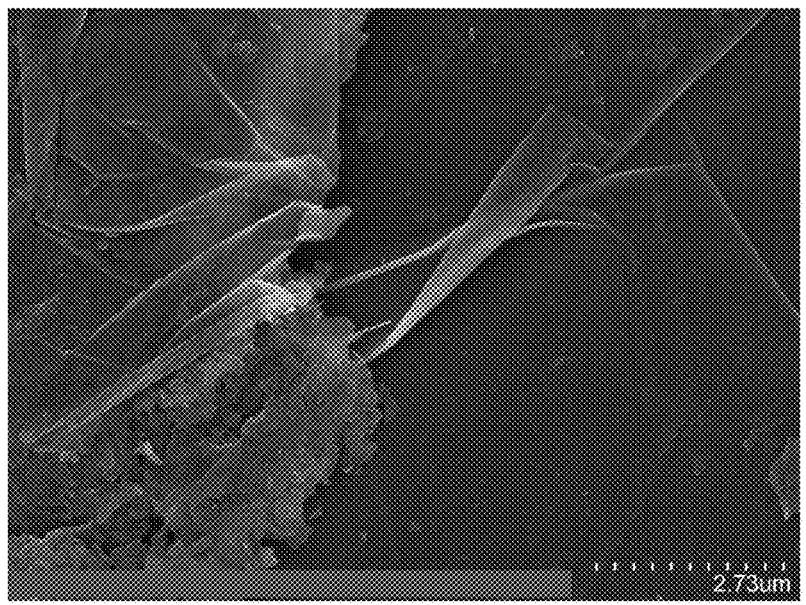
FIG. 7C

PROTECTIVE COATING FOR LITHIUM-CONTAINING ELECTRODE AND METHODS OF MAKING THE SAME

INTRODUCTION

The present disclosure relates generally to lithium-containing electrodes, and more specifically, to forming a protective coating for lithium-containing electrodes, for example, negative lithium metal electrodes, for lithium-containing electrochemical cells, such as lithium ion batteries.

An electrochemical cell, such as a battery, is a device that converts chemical energy into electrical energy by means of electrochemical reduction-oxidation (redox) reactions. In secondary or rechargeable batteries, these electrochemical reactions are reversible, which allows the batteries to undergo multiple charging and discharge cycles.

High-energy density, electrochemical cells, such as lithium ion batteries can be used in a variety of consumer products and vehicles, such as Hybrid Electric Vehicles (HEVs) and Electric Vehicles (EVs). Typical lithium ion, lithium sulfur, and lithium metal batteries include a first electrode, a second electrode, an electrolyte material, and a separator. One electrode serves as a positive electrode or cathode and another serves as a negative electrode or anode. A stack of battery cells may be electrically connected to increase overall output. Conventional rechargeable lithium ion batteries operate by reversibly passing lithium-ions back and forth between the negative electrode and the positive electrode. A separator and an electrolyte are disposed between the negative and positive electrodes. The electrolyte is suitable for conducting lithium ions and may be in solid (e.g., solid state diffusion) or liquid form. Each of the negative and positive electrodes is typically carried on or connected to a metallic current collector, for example, in the form of a thin layer of electrode material. The current collectors may be connected to each other by an interruptible external circuit through which electrons can pass from one electrode to the other while lithium ions migrate in the opposite direction through the electrochemical cell during charging and discharge of the battery.

Lithium ion batteries can reversibly supply power to an associated load device on demand. More specifically, electrical power can be supplied to a load device by a lithium ion battery until the lithium content of the negative electrode is effectively depleted. The battery may then be recharged by passing a suitable direct electrical current in the opposite direction between the electrodes.

During discharge, the negative electrode may contain a relatively high concentration of intercalated lithium, which is oxidized into lithium ions and electrons. The lithium ions travel from the negative electrode (anode) to the positive electrode (cathode), for example, through the ionically conductive electrolyte solution contained within the pores of an interposed porous separator. At the same time, the electrons pass through the external circuit from the negative electrode to the positive electrode. The lithium ions may be assimilated into the material of the positive electrode by an electrochemical reduction reaction. The battery may be recharged after a partial or full discharge of its available capacity by an external power source, which reverses the electrochemical reactions that transpired during discharge.

During recharge, intercalated lithium in the positive electrode is oxidized into lithium ions and electrons. The lithium ions travel from the positive electrode to the negative electrode through the porous separator via the electrolyte, and the electrons pass through the external circuit to the negative electrode. The lithium cations are reduced to elemental lithium at the negative electrode and stored in the material of the negative electrode for reuse.

SUMMARY

This section provides a general summary of the disclosure, and is not a comprehensive disclosure of its full scope or all of its features.

In certain aspects, the present disclosure provides a method for preparing a protective coating on an electrode having a first Li-containing surface. The method may include removing a passivation layer present on the first Li-containing surface of the electrode by applying a graphene source to the first Li-containing surface of the electrode; and forming a protective coating adjacent to at least a portion of the first Li-containing surface. The protective coating can include graphene.

The protective coating may have a thickness of about 0.4 nm to about 200 nm.

The graphene source may be selected from the group consisting of graphite, a graphene nanoplate, a multilayer graphene, a graphene oxide, carbon black, and a combination thereof.

The graphene source may be in a form of particles, a paper, or a roll.

The protective coating may be formed substantially simultaneously as the passivation layer is removed.

The passivation layer may include lithium oxide, lithium carbonate, lithium nitride, lithium hydroxide, or a combination thereof.

The graphene source may be applied in the presence of an inert gas and at a temperature of about 15° C. to about 160° C.

The protective coating can be bonded to the first Li-containing surface by non-covalent interactions.

The method can further include applying a polymer or polymer precursor to form a polymeric coating adjacent to at least a portion of the protective coating.

In other aspects, the present disclosure provides a Li-containing electrode including a first Li-containing surface, a second Li-containing surface opposed to the first Li-containing surface, a protective coating adjacent to at least a portion of the first Li-containing surface. The protective coating can include graphene, and the Li-containing electrode does not have a further coating including graphene adjacent to the second Li-containing surface.

The Li-containing electrode may not have a passivation layer present between the first Li-containing surface and the protective coating.

The protective coating can have a thickness of about 10 nm to about 200 nm.

The protective coating can be bonded to the first Li-containing surface by non-covalent interactions.

The Li-containing electrode can further include a polymeric coating adjacent to at least a portion of the protective coating.

In other aspects, the present disclosure provides a Li-containing electrochemical cell including a negative electrode layer including a Li-containing electrode, a positive electrode layer spaced apart from the negative electrode layer, a porous separator disposed between confronting surfaces of the negative electrode layer and the positive electrode layer, and a liquid electrolyte infiltrating the negative electrode layer, the positive electrode layer, and the porous separator. The Li-containing electrode can include a first Li-containing surface, a second Li-containing surface opposed to the first Li-containing surface, a protective coating adjacent to at least a portion of the first Li-containing surface. The protective coating can include graphene, and the Li-containing electrode does not have a further coating including graphene adjacent to the second Li-containing surface.

The Li-containing electrode may not have a passivation layer present between the first Li-containing surface and the protective coating. The passivation layer can include lithium oxide, lithium carbonate, lithium nitride, lithium hydroxide, or a combination thereof.

The protective coating can have a thickness of about 0.4 nm to about 200 nm.

The protective coating may be bonded to the first Li-containing surface by non-covalent interactions.

The Li-containing electrochemical cell may further include a polymeric coating adjacent to at least a portion of the protective coating.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 7A, 7B, and 7C are Scanning Electron Microscopy (FE-SEM) images of Coated Li Electrode showing different locations of a protective coating comprising graphene present on a lithium-containing electrode.

Figure 8:
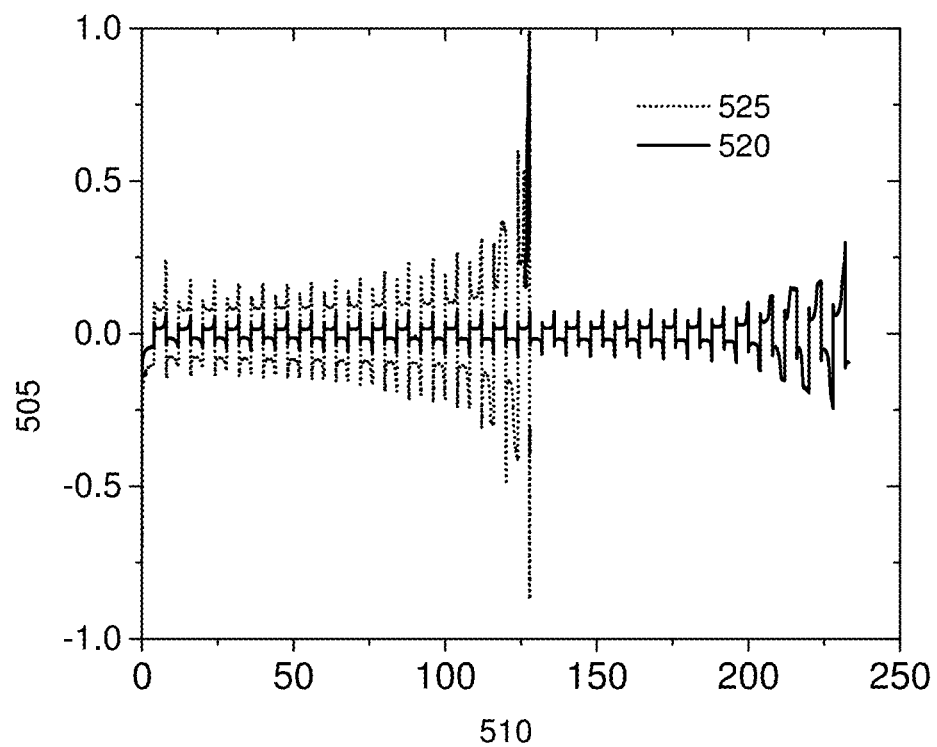

FIG. 8 depicts Voltage (volt) versus Test Time (hours) for the Coated Li Electrode and the Comparative Electrode.

Figure 9:
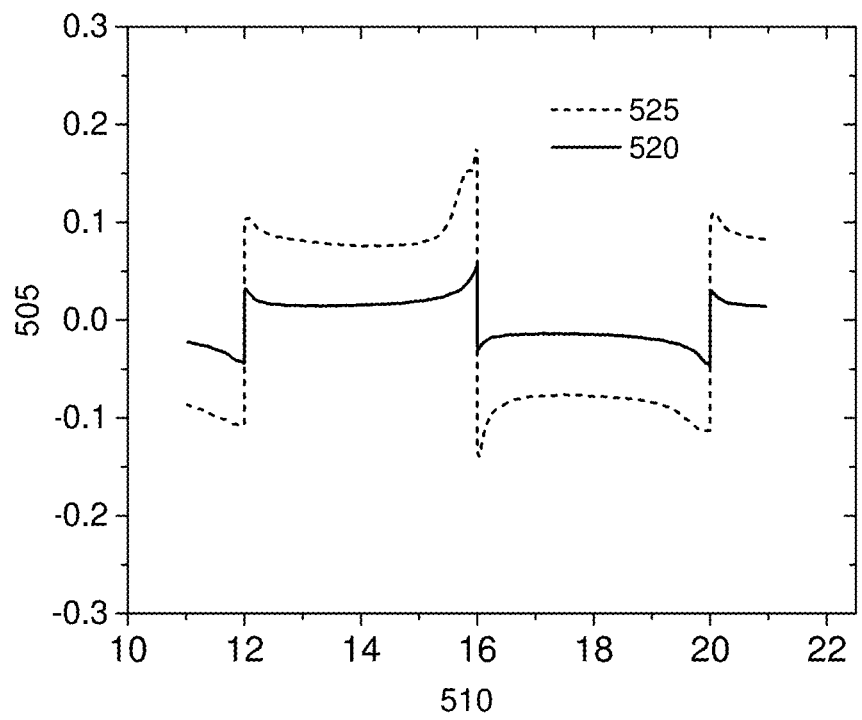

FIG. 9 depicts Voltage (volt) versus Test Time (hours) for the Coated Li Electrode and the Comparative Electrode.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," "attached to," or "coupled to" another element or layer, it may be directly on, engaged, connected, attached or coupled to the other component, element, or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It should be understood for any recitation of a method, composition, device, or system that "comprises" certain steps, ingredients, or features, that in certain alternative variations, it is also contemplated that such a method, composition, device, or system may also "consist essentially of" the enumerated steps, ingredients, or features, so that any other steps, ingredients, or features that would materially alter the basic and novel characteristics of the invention are excluded therefrom.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

I. Lithium-Containing Electrode with Protective Coating and Methods of Making the Same A lithium-containing (Li-containing) electrode comprising a protective coating is provided herein. It has been discovered that a protective coating including graphene can advantageously prevent and/or reduce lithium dendrite growth and mossy lithium formation on the Li-containing electrode. In various aspects, the protective coating as described in more detail below can act as an artificial solid electrolyte interphase (SEI) on a Li-containing electrode and, by suppressing lithium dendrite growth and mossy lithium formation, can improve cycle efficiency of an electrochemical cell.

Figure 1A:
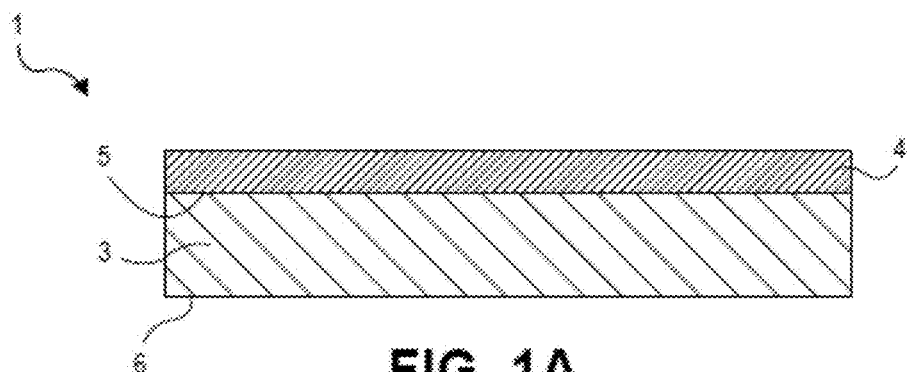
FIG. 1A is a cross-sectional view of a lithium-containing electrode with a protective coating according to one aspect of the disclosure.

For example, as best shown in FIG. 1A, a coated Li-containing electrode 1 includes a Li-containing electrode 3 and a protective coating 4. The Li-containing electrode 3 may include a first Li-containing surface 5 and a second Li-containing surface 6, which is opposed to the first Li-containing surface 5. In some embodiments, the Li-containing electrode 3 can be a homogenous lithium electrode or an electrode having only one Li-containing surface, for example, only the first Li-containing surface layer 5. The protective coating 4 may be adjacent to or disposed on at least a portion of the first Li-containing surface 5 of the Li-containing electrode 3. The protective coating 4 may comprise graphene, for example, as at least a single layer of carbon atoms arranged in a hexagonal lattice. In alternative embodiments, the protective coating 4 may comprise more than one layer of graphene (for example, two layers, three layers, four layers, five layers, ten layers, etc.) or overlapping layers of graphene. In various aspects, the protective coating 4 comprising graphene may adhere to the first Li-containing surface 5 via non-covalent interactions or bonds between graphene and Li atoms present in the first Li-containing surface 5. The Li atoms can interact with the graphene pi electrons ($\pi$ electrons). Without being bound by theory, it is believed that Li atoms interaction with graphene's pi electrons can lead to polarization of the orbital electron cloud.

In some embodiments, the protective coating 4 may have a thickness of at least about 0.1 nm, at least about 0.4 nm, at least about 1 nm, at least about 50 nm, at least about 100 nm, at least about 200 nm, at least about 400 nm, at least about 600 nm, at least about 800 nm, at least about 1 µm, at least about 2.5 µm, at least about 5 µm, or about 10 µm; or in a range from about 0.1 nm to about 10 µm, about 0.4 nm to about 10 µm, about 1 nm to about 10 µm, 0.1 nm to about 5 µm, 0.4 nm to about 1 µm, about 0.1 nm to about 200 nm, about 0.4 nm to about 200 nm, or about 0.4 nm to about 50 nm. Although not shown, it is contemplated herein that the protective coating 4 may be adjacent to or disposed on at least a portion of the second Li-containing surface 6. Alternatively, the Li-containing electrode 3 does not have a further protective coating comprising graphene adjacent to the second Li-containing surface 6.

In various aspects, the protective coating 4 may be substantially continuous and/or the first Li-containing surface 5 may be substantially continuous, preferably both the protective coating 4 and the first Li-containing surface 5 are substantially continuous. In alternative embodiments, the protective coating 4 may be present on the first Li-containing surface 5 as a discontinuous layer. For example, protective coating 4 may include gaps in graphene and/or the protective coating 4 may include overlap amongst graphene layers. In some embodiments, the protective coating 4 (continuous or discontinuous) may be present on at least a portion of the surface area of the first Li-containing surface 5 up to substantially all of the surface area (greater than 98%, greater than 99% or 100% of the surface area) of the first Li-containing surface 5.

In various aspects, the protective coating 4 and the Li-containing electrode 3 including the first Li-containing surface 5 are discrete (or separate) bodies or structures. In other words, the protective coating 4 and the Li-containing electrode 3 can be considered as discrete or separate layers. For example, lithium (Li) atoms are contained within a discrete Li-containing electrode 3, for example, in the first Li-containing surface 5, and the Li atoms are not present within a discrete protective coating 4, for example, within the pores of or embedded in the protective coating 4, at least upon formation of protective coating 4 on the Li-containing electrode 3 and prior to operation of the electrode, for example, in an electrochemical cell. It is contemplated herein, that upon operation, for example, in an electrochemical cell, Li atoms or ions may be present within the protective coating 4.

Figure 1B:
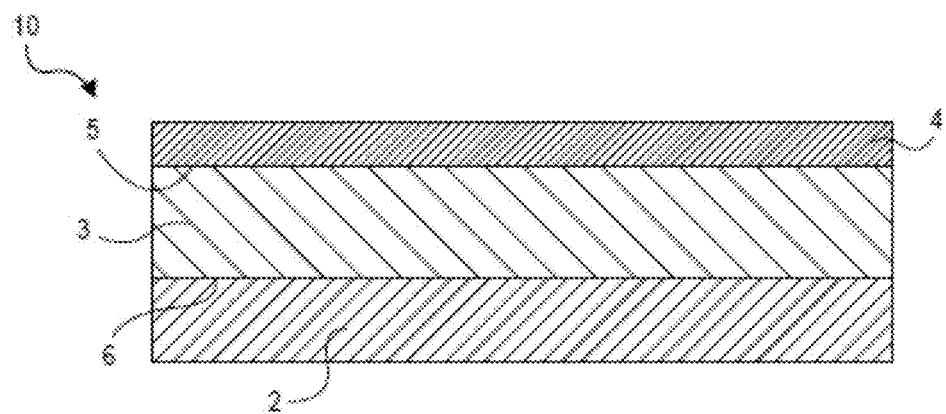
FIG. 1B is a cross-sectional view of a lithium-containing electrode with a protective coating according to another aspect of the disclosure.

Optionally, as shown in FIG. 1B, the Li-containing electrode 3 may be disposed on a substrate 2 in a coated Li-containing electrode 10. The substrate 2 may be any suitable material, for example, a metallic foil, such as but not limited to, copper, nickel, stainless steel, or titanium foils. When assembled in an electrochemical cell, a current collector, such as a negative current collector (further described below), may serve as a substrate on which the Li-containing layer is disposed.

Figure 1C:
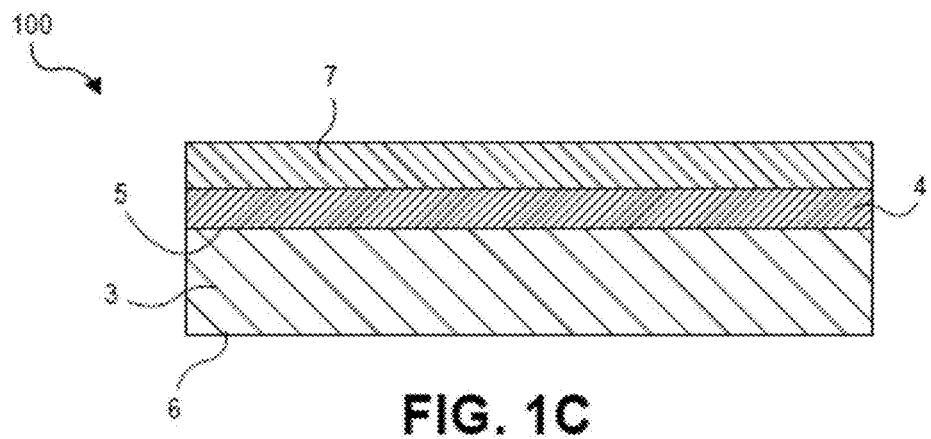
FIG. 1C is a cross-sectional view of a lithium-containing electrode with a protective coating according to another aspect of the disclosure.

In some embodiments, as shown in FIG. 1C, a coated Li-containing electrode 100 may further include a polymeric coating 7 present or disposed adjacent to the protective coating 4. In some embodiments, the polymeric coating 7 may be present as a continuous layer on the protective coating 4. In alternative embodiments, the polymeric coating 7 may be present on the protective coating 4 as a discontinuous layer. In some embodiments, the polymeric coating 7 (continuous or discontinuous) may be present on at least a portion of the surface area of the protective coating 4 up to substantially all of the surface area (greater than 98%, greater than 99% or 100% of the surface area) of the protective coating 4.

In any embodiment, the protective coating may be derived from and/or based on a graphene source, which can be applied to a Li-containing electrode to form a protective coating. Thus, methods of preparing a protective coating on a Li-containing electrode are also provided herein. Advantageously, it has been discovered that a combination of removing a passivation layer and forming a protective coating comprising graphene on a Li-containing electrode can be achieved substantially simultaneously by applying a graphene source to a Li-containing surface of a Li-containing electrode. By removing the passivation layer, better interfacial adhesion between the protective coating 4 and the first Li-containing surface 5 can be achieved, and protective coating 4 comprising graphene can prevent and/or reduce detrimental lithium dendrite growth and mossy lithium formation. Further, the protective coating 4 comprising graphene has a degree of flexibility, which can better accommodate volume change of a Li-containing electrode during cycling. Overall, the method described herein can result in a Li-containing electrode having improved performance characteristics, such as increased cycle efficiency and reduced overpotential, when used in an electrochemical cell. Additionally, application of the graphene source can be accomplished by mechanical means (as further described below) thereby avoiding costly and environmentally unfriendly wet chemistry techniques, which can result in a large amount of undesirable by-products as well as low yields.

Figure 2A:
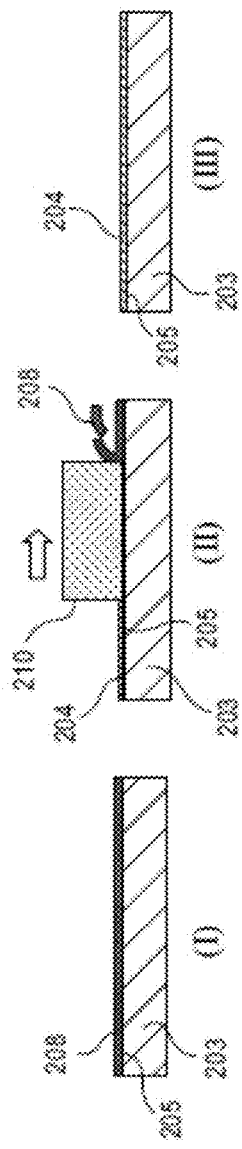
FIG. 2A is a cross-sectional schematic illustrating application of a graphene source to a Li-containing electrode according to one aspect of the disclosure.
Figure 2B:
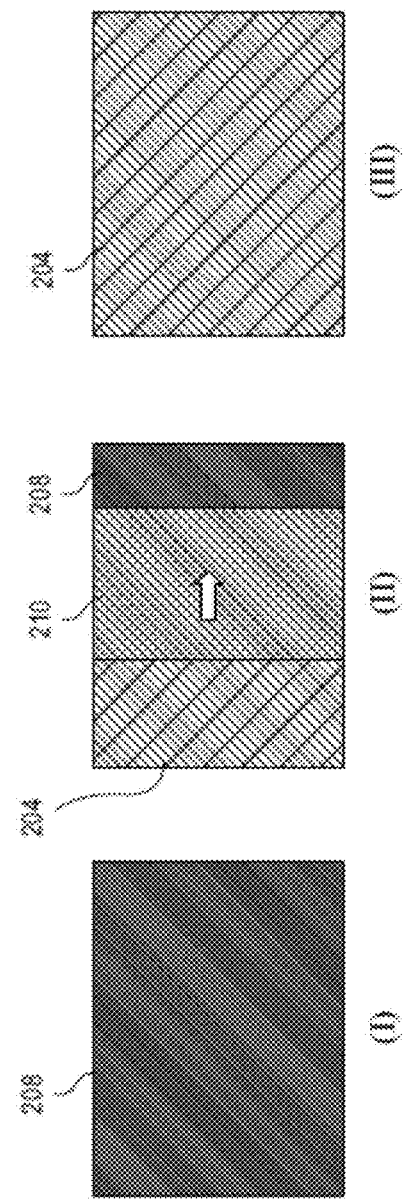
FIG. 2B is top view corresponding to the cross-sectional section of FIG. 2A.

In any embodiment, the method may include removing a passivation layer present on a first Li-containing surface 5 of a Li-containing electrode 3 by applying a graphene source to the first Li-containing surface 5 of the Li-containing electrode 3. The method may further include forming a protective coating 4 comprising graphene adjacent to at least a portion of the first Li-containing surface 5 as the graphene source is applied. For example, as depicted in the schematic in FIG. 2A in (I)-(III), a Li-containing electrode 203 includes a passivation layer 208 on a first Li-containing surface 205 of the Li-containing electrode 203. A graphene source 210 is applied to the Li-containing electrode 203 thereby removing at least a portion or all of the passivation layer 208 while forming a protective coating 204 adjacent to the first Li-containing surface 205. The arrow in FIG. 2A shows movement of the graphene source 210 as it applied along the Li-containing electrode 203. Application of the graphene source 210 forms the protective coating 204 adjacent to the first Li-containing surface 205 of the Li-containing electrode 203. FIG. 2B illustrates a corresponding top-view of the FIG. 2A schematic (I)-(III).

In some embodiments, the graphene source may be further applied to the second Li-containing surface 6 of the Li-containing electrode 3, for example, for removing a passivation layer present on the second Li-containing surface 6 and forming a further protective coating comprise graphene on the second Li-containing surface 6. Alternatively, the graphene source is not applied to second Li-containing surface 6.

The passivation layer may comprise lithium oxide, lithium carbonate, lithium nitride, lithium hydroxide, or a combination thereof. In some embodiments, the protective coating 4 can be formed substantially simultaneously and/or spontaneously as the passivation layer is removed; therefore, the protective coating 4 advantageously can be formed before a new passivation layer can form. Thus, in some embodiments, a Li-containing electrode can be formed that has a small amount of a passivation layer (less than 20%, less than 10%, less than 5% of the original passivation layer) or that does not have substantially any (less than 1%) passivation layer present between the first Li-containing surface 5 and the protective coating 4. Without being bound by theory, it is believed that as a graphene source is applied to a Li-containing surface, non-covalent interaction between graphene pi electrons and Li of the Li-containing surface causes graphene from the graphene source to stick or adhere to the Li-containing surface thereby forming the protective coating 4 on the first Li-containing surface 5. The binding energy between the Li-containing surface and the graphene layer is stronger (e.g., about 0.9 eV to about 1.7 eV) than the binding energy between graphene to graphene interactions of the graphene source (e.g., about 0.024 eV to about 0.05 eV). Further, application of the graphene source also physically removes a passivation layer, which may be present on the first Li-containing surface 5. Removal of the passivation layer is critical in achieving strong adhesion between graphene and the Li-containing surface.

Figure 3A:
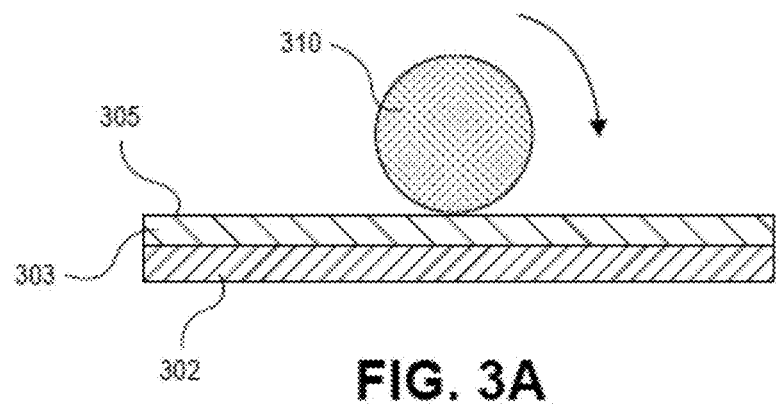
FIG. 3A illustrates a method of applying a graphene source to a Li-containing electrode according to one aspect of the disclosure.
Figure 3B:
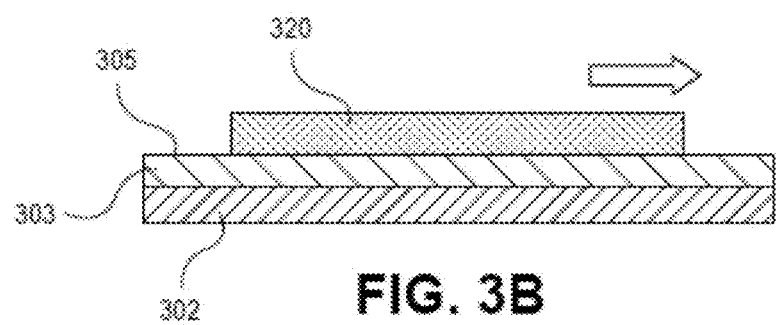
FIG. 3B illustrates a method of applying a graphene source to a Li-containing electrode according to another aspect of the disclosure.
Figure 3C:
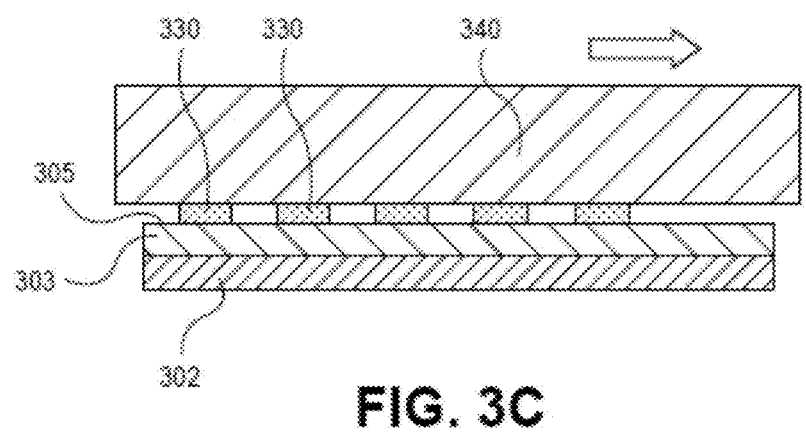
FIG. 3C illustrates a method of applying a graphene source to a Li-containing electrode according to another aspect of the disclosure.

In various aspects, the graphene source may be graphite, a graphene nanoplate, a multilayer graphene, a graphene oxide, carbon black, or combinations thereof. Examples of graphite include, but are not limited to, natural graphite, synthetic graphite, and highly oriented pyrolytic graphite (HOPG). In some embodiments, the graphene source may be in the form of particles, a paper, a roll, or a combination thereof for application to a Li-containing electrode. As discussed above, the graphene source may be mechanically applied, for example, by rolling, sliding, and/or or moving the graphene source along the first Li-containing surface 5 of the Li-containing electrode 3. For example, as illustrated in FIG. 3A, a graphene source 310 in the form of a roll may be rolled along a first Li-containing surface 305 of the Li-containing electrode 303, which may optionally be disposed on a substrate 302. Alternatively, as illustrated in FIG. 3B, a graphene source 320 in the form of paper may be slid or moved along a first Li-containing surface 305 of the Li-containing electrode 303, which may optionally be disposed on a substrate 302. Alternatively, as illustrated in FIG. 3C, a graphene source 330 in the form of particles or powder attached to backing 340 (such as a disc) may be slid or moved along a first Li-containing surface 305 of the Li-containing electrode 303, which may optionally be disposed on a substrate 302. The arrows in FIGS. 3A-3C illustrate movement of the graphene source 310, 320, 330. FIGS. 3A-3C are intended to illustrate movement of the graphene source and do not show the passivation layer or the protective coating, although it is contemplated herein that such features can be present. In various aspects, the graphene source may be rolled, slid, and/or moved along a first Li-containing surface more than once (for example, two times, three times, four times, five times, ten times, etc.) and/or in one or more various directions, for example, back and forth, side to side, in a horizontal direction, in a diagonal direction, in a circular direction, etc. In various aspects, the graphene source may be applied in the presence of an inert gas, such as argon, at a temperature of about 15° C. to about 160° C., and at a pressure of about 100 Pa to about 15 MPa.

In some embodiments, the method may further include applying a polymer and/or polymer precursor to the Li-containing electrode 3 to form the polymeric coating 7 adjacent to at least a portion of the protective coating 4. Examples of suitable polymers include, but are not limited to, polyvinylidene fluoride (PVDF), polyacrylic acid (PAA), lithium polyacrylate (Li-PAA), polyethylene (PE), polytetrafluoroethylene (PTFE), polyimide, and combinations thereof. In various aspects, where a polymer precursor is used, the polymer precursor may include a monomer used to form the polymer. In such instances, the polymer precursor and/or the correspondingly formed polymer can be applied to a Li-containing electrode. The polymer precursor can form a polymer selected from the group consisting of polyvinylidene fluoride (PVDF), polyacrylic acid (PAA), lithium polyacrylate (Li-PAA), polyethylene (PE), polytetrafluoroethylene (PTFE), polyimide, and combinations thereof. The polymer and/or the polymer precursor may be applied under suitable conditions to form the polymeric coating 7 adjacent to the protective coating 4. The polymer and/or polymer precursor may be applied to a Li-containing electrode by any suitable means known in the art. For example, various known deposition techniques may be used to apply the polymeric coating, such as but not limited to, physical vapor deposition (PVD) (e.g., thermal evaporation, sputtering, etc.) and chemical vapor deposition (CVD) (e.g., low pressure chemical vapor depositions (LPCVD)), thermal CVD, etc. In any embodiment, in applying the polymer and/or polymer precursor, the deposition temperature may be about 18° C. to about 150° C., preferably about 18° C. to about 25° C., and the deposition time may be about 5 minutes to about 60 minutes, about 10 minutes to about 40 minutes or about 30 minutes. The deposition may be performed in the presence of an inert gas, such as but not limited to, Ar, for example 99.9% purity Ar. For sputtering processes, the sputtering power (radio frequency) may be about 50 W to about 200 W or about 100 W to about 200 W, and the polymer and/or polymer precursor may be sputtered from polymer plates or disks. Additionally or alternatively, wet chemistry techniques may be used as well, such as but not limited to, using a fluoropolymer precursor containing solution, such as a monomer containing solution, to coat a Li-containing electrode, for example, via a dip coating or spin coating process. The polymeric coating may have a structure derived from or based on the corresponding polymer and/or polymer precursor used during the preparation method, which may be similar, but may differ from the polymer and/or polymer precursor. In some embodiments, the polymeric coating may be derived from polyvinylidene fluoride (PVDF), polyacrylic acid (PAA), lithium polyacrylate (Li-PAA), polyethylene (PE), polytetrafluoroethylene (PTFE), polyimide, and combinations thereof.

II. Lithium-Containing Electrochemical Cell

Lithium-containing (Li-containing) electrochemical cells typically include a negative electrode, a positive electrode, an electrolyte for conducting lithium ions between the negative and positive electrodes, and a porous separator between the negative electrode and the positive electrode to physically separate and electrically insulate the electrodes from each other while permitting free ion flow. When assembled in an electrochemical cell, for example, in a lithium-ion battery or a lithium-sulfur battery, the porous separator is infiltrated with a liquid electrolyte.

Figure 4:
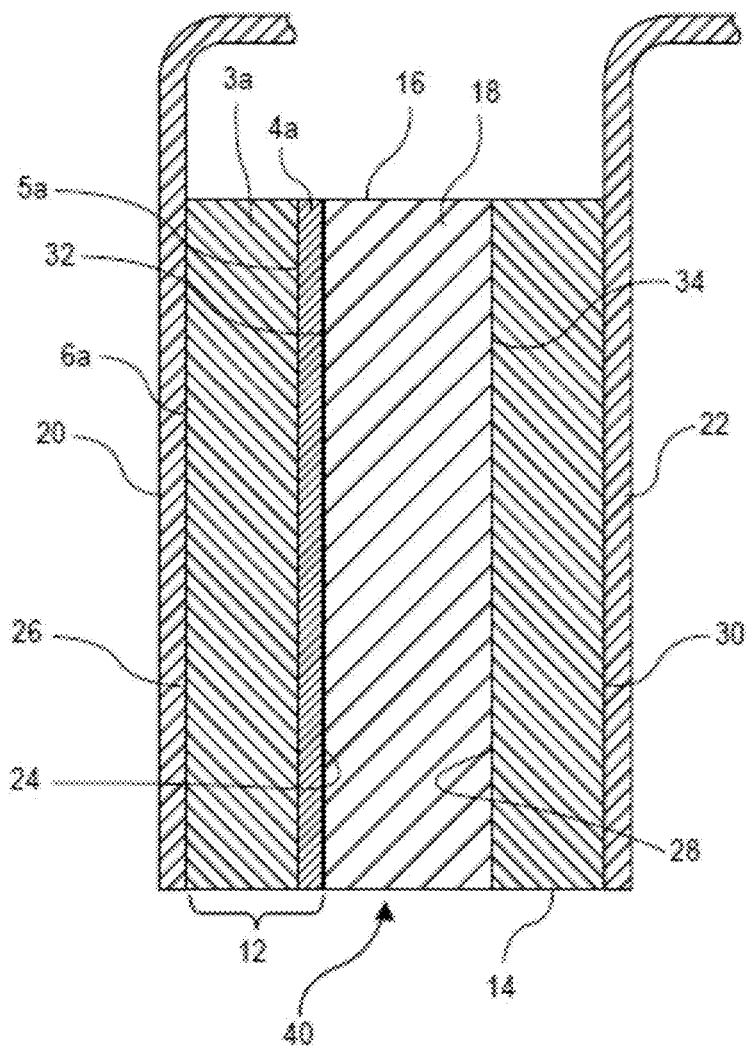
FIG. 4 is a cross-sectional view of a lithium-containing electrochemical cell according to one aspect of the disclosure.

A Li-containing electrochemical cell for use in batteries, for example, a lithium ion battery or a lithium sulfur battery, or as capacitors is provided herein. The Li-containing electrochemical cell may comprise a negative electrode layer, a positive electrode layer spaced apart from the negative electrode layer, a porous separator disposed between confronting surfaces of the negative electrode layer and the positive electrode layer, and a liquid electrolyte infiltrating the negative electrode layer, the positive electrode layer, and the porous separator. For example, as best shown in FIG. 4, a Li-containing electrochemical cell 40 (also referred to herein as "the electrochemical cell 40" or "cell 40") of a lithium ion battery (not shown) includes a negative electrode layer 12, a positive electrode layer 14, a porous separator 16, and a liquid electrolyte 18 that impregnates, infiltrates, or wets the surfaces of and fills the pores of each of the negative electrode layer 12, the positive electrode layer 14, and the porous separator 16. A negative electrode current collector 20 is positioned adjacent and electrically coupled to the negative electrode layer 12, and a positive electrode current collector 22 is positioned adjacent and electrically coupled to the positive electrode layer 14.

The negative and positive electrode layers 12, 14 may be coated, deposited, or otherwise formed on opposing major surfaces of the negative and positive electrode current collectors 20, 22. The negative electrode layer 12 includes an anterior surface 24 and an opposite posterior surface 26 relative to the location of the separator 16. The positive electrode layer 14 is spaced-apart from the negative electrode layer 12 and similarly includes an anterior surface 28 and an opposite posterior surface 30. In assembly, the anterior surfaces 24, 28 of the negative and positive electrodes 12, 14 confront one another, with the separator 16 sandwiched between the confronting anterior surfaces 24, 28 of the negative and positive electrode layers 12, 14. In particular, the separator 16 includes a first side 32 that faces toward the negative electrode layer 12 and an opposite second side 34 that faces toward the positive electrode 14. The negative electrode current collector 20 interfaces with or engages the posterior surface 26 of the negative electrode layer 12 and the positive electrode current collector 22 interfaces with or engages the posterior surface 30 of the positive electrode layer 14.

The electrochemical cell 40 may have a thickness, measured from an outer surface of the negative electrode current collector 20 to an opposite outer surface of the positive electrode current collector 22 in the range of about 100 µm to about 1 mm Individually, the current collectors 20, 22 may have thicknesses of about 20 µm, the electrode layers 12, 14 may have thicknesses of up to 200 µm, and the porous separator 16 may have a thickness of about 25 µm.

In certain other variations, the electrochemical cell may be a supercapacitor, such as a lithium-ion based supercapacitor.

A. Negative Electrode

Figure 5:
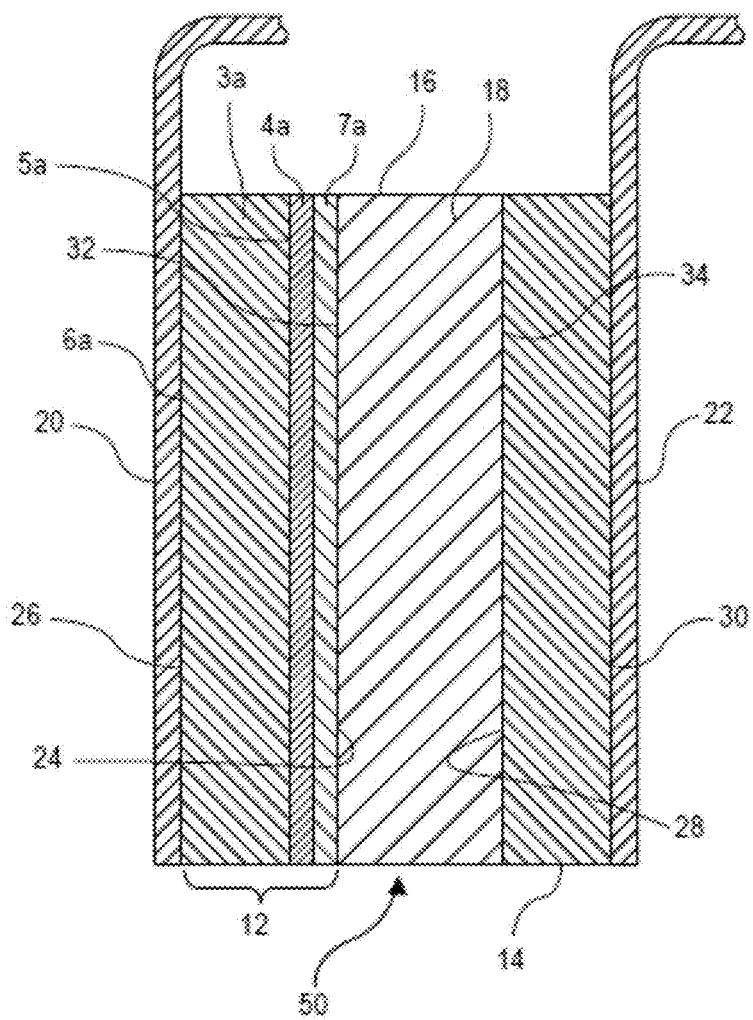
FIG. 5 is a cross-sectional view of a lithium-containing electrochemical cell according to another aspect of the disclosure.

In various aspects, the negative electrode layer 12 may comprise the Li-containing electrode including a protective coating as described above, for example, comprising a Li-containing electrode 3a and a protective coating 4a comprising graphene, all as described herein. The protective coating 4a may be present adjacent to or disposed on a first Li-containing surface 5a of the Li-containing electrode 3a. In some embodiments, the Li-containing electrode 3a does not have a further protective coating comprising graphene adjacent to or disposed on a second Li-containing surface 6a. In some embodiments, the Li-containing electrode 3a may have a small amount of a passivation layer (less than 20%, less than 10%, less than 5% of the original passivation layer) or does not have substantially any (less than 1%) passivation layer present between the first Li-containing surface 5a and the protective coating 4a. The negative electrode layer 12 can undergo the reversible insertion, intercalation, or plating of lithium ions at a lower electrochemical potential than the material of the positive electrode layer 14 such that an electrochemical potential difference exists between the electrode layers 12, 14. In certain variations, the material of the negative electrode layer 12 may be generally described as an intercalation host material. As illustrated in FIG. 5 in electrochemical cell 50, the Li-containing electrode 3a may optionally further include a polymeric coating 7a as described herein adjacent to or disposed on the protective coating 4a.

The negative electrode layer 12 may optionally further include metallic lithium, lithium based alloys (such as lithium silicon alloy, lithium aluminum alloy, lithium indium alloys), carbon-based materials (e.g., graphite, activated carbon, carbon black, and graphene), silicon, silicon-based alloys or composite materials, tin oxide, aluminum, indium, zinc, germanium, silicon oxide, titanium oxide, lithium titanate, and combinations thereof. The intercalation host material of the negative electrode layer 12 may be intermingled with a polymeric binder to provide the negative electrode layer 12 with structural integrity. Some examples of suitable polymeric binders include polyvinylidene fluoride (PVDF), ethylene propylene diene monomer (EPDM) rubber, styrene butadiene rubber (SBR), carboxymethyl cellulose (CMC), polyacrylic acid, and mixtures thereof. The negative electrode layer 12 optionally may include particles of an electrically conductive material, which may comprise very fine particles of, for example, high-surface area carbon black. In other variations, the negative electrode layer 12 may be a metal film or foil.

B. Positive Electrode

The positive electrode layer 14 may comprise any material that can undergo the reversible insertion, intercalation, or plating of lithium ions. In one form, the positive electrode layer 14 comprises a lithium-based intercalation host material having a higher electrochemical potential than the intercalation host material of the negative electrode layer 12. In certain variations, the intercalation host material of the positive electrode layer 14 suitably may comprise a layered oxide represented by the formula $LiMeO_2$, an olivine-type oxide represented by the formula $LiMePO_4$, a spinel-type oxide represented by the formula $LiMe_2O_4$, or a combination thereof, where Me is a transition metal. Some examples of suitable transition metals for the metal oxide of the intercalation host material of the positive electrode layer 14 include Co, Ni, Mn, Fe, Al, V, and combinations thereof. More specifically, the lithium-based intercalation host material may comprise a layered lithium transition metal oxide, such as lithium cobalt oxide ($LiCoO_2$) and lithium-nickel-manganese-cobalt oxide [$Li(Ni_xMn_yCo_z)O_2$], a spinel lithium transition metal oxide, such as spinel lithium manganese oxide ($LiMn_2O_4$), lithium iron phosphate ($LiFePO_4$), or lithium fluorophosphate ($Li_2FePO_4F$), lithium nickel oxide ($LiNiO_2$), lithium aluminum manganese oxide ($Li_xAl_yMn_{1-y}O_2$), lithium vanadium oxide ($LiV_2O_5$), or a combination thereof. The same polymeric binder materials (PVdF, EPDM, SBR, CMC, polyacrylic acid) and electrically conductive particles (high-surface area carbon black) used in the negative electrode layer 12 also may be intermingled with the lithium-based intercalation host material of the positive electrode layer 14 for the same purposes.

Alternatively, the positive electrode layer 14 can comprise sulfur, for example, where the electrochemical cell is for use as a lithium sulfur battery. While in lithium ion batteries, lithium intercalates and/or alloys in the electrode active materials, in a lithium sulfur battery, instead of intercalating or alloying, the lithium dissolves from the negative electrode and migrates to the positive electrode where it reacts/plates during discharge, while during charging, lithium plates on the negative electrode. In a lithium sulfur battery, positive electrodes may have elemental sulfur as the active material or a sulfur-containing active material.

C. Electrolyte

The electrolyte 18 may comprise any material that is capable of effectively conducting lithium ions through the porous separator 16 and between the negative and positive electrode layers 12, 14. For example, the electrolyte 18 may be a liquid comprising a non-aqueous liquid electrolyte. In such case, the liquid electrolyte 18 may comprise a solution including a lithium salt dissolved or ionized in a nonaqueous, aprotic organic solvent or a mixture of nonaqueous, aprotic organic solvents. Some suitable lithium salts that may be used to make the electrolyte 18 include $LiClO_4$, $LiAlCl_4$, LiI, LiBr, LiSCN, $LiBF_4$, $LiB(C_6H_5)_4$, $LiAsF_6$, $LiCF_3SO_3$, $LiN(CF_3SO_2)_2$, $LiPF_6$, and combinations thereof. The nonaqueous, aprotic organic solvent in which the lithium salt is dissolved may be a cyclic carbonate (i.e., ethylene carbonate, propylene carbonate), an acyclic carbonate (i.e., dimethyl carbonate, diethyl carbonate, ethyl methyl carbonate), an aliphatic carboxylic ester (i.e., methyl formate, methyl acetate, methyl propionate), a γ-lactone (i.e., γ-butyrolactone, γ-valerolactone), an acyclic ether (i.e., 1,2-dimethoxyethane, 1,2-diethoxyethane, ethoxymethoxyethane), a cyclic ether (i.e., tetrahydrofuran, 2-methyltetrahydrofuran), or a combination thereof. In some embodiments, the electrolyte may include fluorine-containing additives, such as but not limited to, fluoroethylene carbonate. Alternatively, the electrolyte may not include fluorine-containing additives. In some embodiments, the electrolyte may be an ether containing electrolyte, for example a lithium salt in an ether solvent, such as lithium bis(fluorosulfonyl) imide in 1,2-demethoxyethane.

D. Electrode Current Collectors

The negative and positive electrode current collectors 20, 22 respectively associated with the negative and positive electrode layers 12, 14 may comprise any metallic material capable of collecting and reversibly passing free electrons to and from their respective electrode layers 12, 14. For example, the negative and positive electrode current collectors 20, 22 may comprise thin and flexible metallic foils. In one specific example, the positive electrode current collector 22 may comprise aluminum, nickel, or stainless steel foils and the negative electrode current collector 20 may comprise copper, nickel, stainless steel, or titanium foils. Other types of metal foils or metallic materials may of course be used, if desired.

E. Porous Separator

The porous separator 16 may include, in instances, a microporous polymeric separator including a polyolefin (including those made from a homopolymer (derived from a single monomer constituent) or a heteropolymer (derived from more than one monomer constituent)), which may be either linear or branched. In certain aspects, the polyolefin may be polyethylene (PE), polypropylene (PP), or a blend of PE and PP, or multi-layered structured porous films of PE and/or PP. Commercially available polyolefin porous separator membranes include CELGARD® 2500 (a monolayer polypropylene separator) and CELGARD® 2320 (a trilayer polypropylene/polyethylene/polypropylene separator) available from Celgard LLC.

When the porous separator 16 is a microporous polymeric separator, it may be a single layer or a multi-layer laminate. For example, in one embodiment, a single layer of the polyolefin may form the entire microporous polymer separator 16. In other aspects, the separator 16 may be a fibrous membrane having an abundance of pores extending between the opposing surfaces and may have a thickness of less than a millimeter, for example. As another example, however, multiple discrete layers of similar or dissimilar polyolefins may be assembled to form the microporous polymer separator 16. The microporous polymer separator 16 may also include other polymers alternatively or in addition to the polyolefin such as, but not limited to, polyethylene terephthalate (PET), polyvinylidene fluoride (PVdF), polyamide (nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polymethylpentene, polyolefin copolymers, acrylonitrile-butadiene styrene copolymers (ABS), polystyrene copolymers, polymethylmethacrylate (PMMA), polysiloxane polymers (such as polydimethylsiloxane (PDMS)), polybenzimidazole (PBI), polybenzoxazole (PBO), polyphenylenes, polyarylene ether ketones, polyperfluorocyclobutanes, polyvinylidene fluoride copolymers (e.g., PVdF-hexafluoropropylene or (PVdF-HFP)), and polyvinylidene fluoride terpolymers, polyvinylfluoride, liquid crystalline polymers (e.g., VECTRAN™ (Hoechst AG, Germany) and ZENITE® (DuPont, Wilmington, Del.)), polyaramides, polyphenylene oxide, cellulosic materials, meso-porous silica, and/or combinations thereof.

Furthermore, the porous separator 16 may be mixed with a ceramic material or its surface may be coated in a ceramic material. For example, a ceramic coating may include alumina ($Al_2O_3$), silicon dioxide ($SiO_2$), or combinations thereof. Various conventionally available polymers and commercial products for forming the separator 16 are contemplated, as well as the many manufacturing methods that may be employed to produce such a microporous polymer separator 16.

III. Battery

Figure 6:
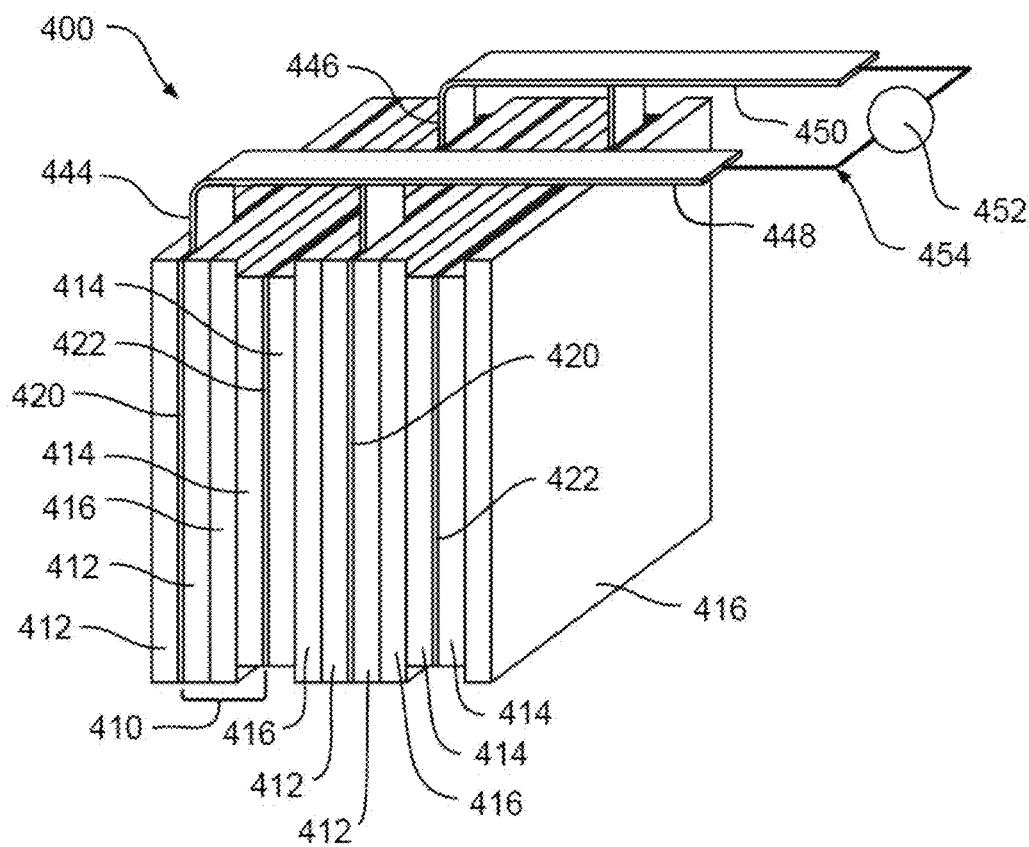
FIG. 6 is a partial perspective view of a lithium ion battery including a plurality of stacked electrochemical cells according to one aspect of the disclosure.

Referring now to FIG. 6, the electrochemical cell 40 (as shown in FIG. 4) may be combined with one or more other electrochemical cells to produce a lithium ion battery 400. The lithium ion battery 400 illustrated in FIG. 6 includes multiple rectangular-shaped electrochemical cells 410. Anywhere from 5 to 150 electrochemical cells 410 may be stacked side-by-side in a modular configuration and connected in series or parallel to form a lithium ion battery 400, for example, for use in a vehicle powertrain. The lithium ion battery 400 can be further connected serially or in parallel to other similarly constructed lithium ion batteries to form a lithium ion battery pack that exhibits the voltage and current capacity demanded for a particular application, e.g., for a vehicle. It should be understood the lithium ion battery 400 shown in FIG. 6 is only a schematic illustration, and is not intended to inform the relative sizes of the components of any of the electrochemical cells 410 or to limit the wide variety of structural configurations a lithium ion battery 400 may assume. Various structural modifications to the lithium ion battery 400 shown in FIG. 6 are possible despite what is explicitly illustrated.

Each electrochemical cell 410 includes a negative electrode 412, a positive electrode 414, and a separator 416 situated between the two electrodes 412, 414. Each of the negative electrode 412, the positive electrode 414, and the separator 416 is impregnated, infiltrated, or wetted with a liquid electrolyte capable of transporting lithium ions. A negative electrode current collector 420 that includes a negative polarity tab 444 is located between the negative electrodes 412 of adjacent electrochemical cells 410. Likewise, a positive electrode current collector 422 that includes a positive polarity tab 446 is located between neighboring positive electrodes 414. The negative polarity tab 444 is electrically coupled to a negative terminal 448 and the positive polarity tab 446 is electrically coupled to a positive terminal 450. An applied compressive force usually presses the current collectors 420, 422, against the electrodes 412, 414 and the electrodes 412, 414 against the separator 416 to achieve intimate interfacial contact between the several contacting components of each electrochemical cell 410.

One or more of the negative electrodes 412 may comprise a Li-containing electrode, like the Li-containing electrode 1 and 100 depicted in FIGS. 1A and 1C, respectively. In such case, the one or more negative electrodes 412 each may include a Li-containing electrode, a protective coating comprising graphene adjacent to a first Li-containing surface of the Li-containing electrode, and optionally, a polymeric coating adjacent to the protective coating, all as described herein.

In the embodiment depicted in FIG. 6, the battery 400 includes two pairs of positive and negative electrodes 412, 414. In other embodiments, the battery 400 may include more than two pairs of positive and negative electrodes 412, 414. In one form, the battery 400 may include 15-60 pairs of positive and negative electrodes 412, 414. In addition, although the battery 400 depicted in FIG. 6 is made up of a plurality of discrete electrodes 412, 414 and separators 416, other arrangements are certainly possible. For example, instead of discrete separators 416, the positive and negative electrodes 412, 414 may be separated from one another by winding or interweaving a single continuous separator sheet between the positive and negative electrodes 412, 414. In another example, the battery 400 may include continuous and sequentially stacked positive electrode, separator, and negative electrode sheets folded or rolled together to form a "jelly roll."

The negative and positive terminals 448, 450 of the lithium ion battery 400 are connected to an electrical device 452 as part of an interruptible circuit 454 established between the negative electrodes 412 and the positive electrodes 414 of the many electrochemical cells 410. The electrical device 452 may comprise an electrical load or power-generating device. An electrical load is a power-consuming device that is powered fully or partially by the lithium ion battery 400. Conversely, a power-generating device is one that charges or re-powers the lithium ion battery 400 through an applied external voltage. The electrical load and the power-generating device can be the same device in some instances. For example, the electrical device 452 may be an electric motor for a hybrid electric vehicle or an extended range electric vehicle that is designed to draw an electric current from the lithium ion battery 400 during acceleration and provide a regenerative electric current to the lithium ion battery 400 during deceleration. The electrical load and the power-generating device can also be different devices. For example the electrical load may be an electric motor for a hybrid electric vehicle or an extended range electric vehicle and the power-generating device may be an AC wall outlet, an internal combustion engine, and/or a vehicle alternator.

The lithium ion battery 400 can provide a useful electrical current to the electrical device 452 by way of the reversible electrochemical reactions that occur in the electrochemical cells 410 when the interruptible circuit 454 is closed to connect the negative terminal 448 and the positive terminal 450 at a time when the negative electrodes 412 contain a sufficient quantity of intercalated lithium (i.e., during discharge). When the negative electrodes 412 are depleted of intercalated lithium and the capacity of the electrochemical cells 410 is spent, the lithium ion battery 400 can be charged or re-powered by applying an external voltage originating from the electrical device 452 to the electrochemical cells 410 to reverse the electrochemical reactions that occurred during discharge.

Although not depicted in the drawings, the lithium ion battery 400 may include a wide range of other components. For example, the lithium ion battery 400 may include a casing, gaskets, terminal caps, and any other desirable components or materials that may be situated between or around the electrochemical cells 410 for performance related or other practical purposes. For example, the lithium ion battery 400 may be enclosed within a case (not shown). The case may comprise a metal, such as aluminum or steel, or the case may comprise a film pouch material with multiple layers of lamination. In one form, lithiated zeolite particles may be disposed on a surface of the case for the lithium ion battery 400 (not shown).

EXAMPLES

Example 1—Preparation of Electrode

A Li electrode without a graphene protective coating was purchased from MTI Corp. A thin layer of graphene was applied on the Li electrode using a highly oriented pyrolytic graphite (HOPG) plate. The HOPG plate was pressed with pressure around 20000 Pa onto a Li-containing surface of the Li electrode and slide in one direction to remove a passivation layer on the Li electrode. The freshly exposed Li metal surface contacted the HOPG plate and formed strong bonds to HOPG. A layer of graphene from the HOPG plated remained on the Li-containing surface, which served as a protective coating to form "Coated Li Electrode." FIGS. 7A, 7B, and 7C are Scanning Electron Microscopy (FE-SEM) images of the Coated Li Electrode showing different locations of the protective coating comprising graphene present on the lithium-containing electrode For comparison purposes, a Li electrode without a graphene protective coating, which was purchased from MTI Corp. (referred to as "Comparative Li Electrode") was also tested as described below.

Example 2—Performance Testing

The Coated Li Electrode and Comparative Li Electrode were each used in symmetrical 2030 coin cells (both the positive and negative electrodes were the same) and each were cycled in an electrolyte, 1M $LiPF_6$ in ethylene carbonate/diethyl carbonate (1:1 wt. %). For each coin cell, the electrolyte was kept at 75 μL. An alumina nanoparticle coated polyethylene membrane was used as the separator. The cut-off voltage was ±1 voltage. The current density was 1 $mA/cm^2$ and the charge/discharge capacity was 4 $mAh/cm^2$. The electrochemical testing was carried out using Arbin BT2000. FIGS. 8 and 9 depicts voltage (volt) versus test time (hours) for the Coated Li Electrode 520 and the Comparative Electrode 525, the y-axis 505 shows voltage (V) and the x-axis 510 shows test time (hours). As shown in FIGS. 8 and 9, with coating protection, the Coated Li Electrode had improved cycle stability. The Coated Li Electrode also had lower overpotential, which indicated that a relatively stable SEI formed on the electrode surface including the graphene coating and less electrolyte decomposition The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for preparing a protective coating on an electrode having a first Li-containing surface comprising:
    moving a graphene source along the first Li-containing surface of the electrode thereby:
    (i) removing a passivation layer present on the first Li-containing surface of the electrode; and
    (ii) forming a protective coating adjacent to at least a portion of the first Li-containing surface, wherein the protective coating comprises graphene and wherein the protective coating is bonded to the first Li-containing surface by non-covalent interactions;
wherein the protective coating is formed simultaneously as the passivation layer is removed;
wherein the graphene source is moved along the first Li-containing surface in at least one direction selected from the group consisting of a back and forth direction, a side to side direction, a horizontal direction, a diagonal direction, and a circular direction; and
wherein the graphene source is moved along the first Li-containing surface in the presence of an inert gas and at a pressure of about 100 Pa to about 15 MPa.

2. The method of claim 1, wherein the protective coating has a thickness of about 0.4 nm to about 200 nm.

3. The method of claim 1, wherein the graphene source is selected from the group consisting of graphite, a graphene nanoplate, a multilayer graphene, a graphene oxide, carbon black, and a combination thereof.

4. The method of claim 1, wherein the graphene source is in a form of a paper, or a roll.

5. The method of claim 1, wherein the passivation layer comprises lithium oxide, lithium carbonate, lithium nitride, lithium hydroxide, or a combination thereof.

6. The method of claim 1, wherein the graphene source is moved along the first Li-containing surface at a temperature of about 15° C. to about 160° C.

7. The method of claim 1, wherein Li atoms are not present within the protective coating prior to operation of the electrode.

8. The method of claim 1, further comprising applying a polymer or polymer precursor to form a polymeric coating adjacent to at least a portion of the protective coating.

9. A method for preparing a protective coating on an electrode having a first Li-containing surface comprising:
moving a graphene source along the first Li-containing surface of the electrode thereby, wherein the graphene source is in a form of a paper or a roll:
(i) removing a passivation layer present on the first Li-containing surface of the electrode; and
(ii) forming a protective coating adjacent to at least a portion of the first Li-containing surface, wherein the protective coating comprises graphene, wherein the protective coating is bonded to the first Li-containing surface by non-covalent interactions, and wherein Li atoms are not present within the protective coating prior to operation of the Li-containing electrode;
wherein the protective coating is formed simultaneously as the passivation layer is removed;
wherein the graphene source is moved along the first Li-containing surface in at least one direction selected from the group consisting of a back and forth direction, a side to side direction, a horizontal direction, a diagonal direction, and a circular direction; and
wherein the graphene source is moved along the first Li-containing surface in the presence of an inert gas and at a pressure of about 100 Pa to about 15 MPa.

* * * * *